(12) United States Patent
Cheng

(10) Patent No.: US 8,672,811 B2
(45) Date of Patent: Mar. 18, 2014

(54) POWER GENERATING DEVICE CONNECTED WITH EXERCISER

(76) Inventor: Huan-Yu Cheng, Taichung (TW)

( * ) Notice: Subject to any disclaimer, the term of this patent is extended or adjusted under 35 U.S.C. 154(b) by 320 days.

(21) Appl. No.: 13/028,015

(22) Filed: Feb. 15, 2011

(65) Prior Publication Data

US 2012/0184408 A1 Jul. 19, 2012

(30) Foreign Application Priority Data

Jan. 19, 2011 (TW) .............................. 100201172 U

(51) Int. Cl.
*A63B 71/00* (2006.01)
*A63B 15/02* (2006.01)
*B62J 6/08* (2006.01)
*H02K 7/10* (2006.01)
*H02K 7/18* (2006.01)

(52) U.S. Cl.
USPC .................................. 482/2; 482/1; 310/75 C

(58) Field of Classification Search
USPC .................................. 482/2, 1, 148; 310/75 C
See application file for complete search history.

(56) References Cited

U.S. PATENT DOCUMENTS

| | | | | |
|---|---|---|---|---|
| 643,095 | A | * | 2/1900 | Holdrege .................... 310/75 C |
| 5,050,865 | A | * | 9/1991 | Augspurger et al. ............. 482/2 |
| 2010/0022353 | A1 | * | 1/2010 | Hsiao ................................ 482/2 |
| 2010/0279819 | A1 | * | 11/2010 | Ono ................................. 482/2 |

* cited by examiner

*Primary Examiner* — Loan Thanh
*Assistant Examiner* — Shila Jalalzadeh Abyane

(57) ABSTRACT

A power generating device includes a power generating unit and a frame, wherein the power generating unit is connected to the frame by two outer casings with two respective arms. The power generating unit has an input shaft and a roller is mounted to the input shaft. The frame is connected to the exerciser and a shock-absorbing member is located beneath the frame. Two resilient members are connected to two ends of the frame and two ends of each resilient member are respectively connected to the frame and the power generating unit so as to urge the roller to contact against the energy transferring end. The shock-absorbing member absorbs vibration from the power generating unit. The users operate the exerciser and generate electric power.

4 Claims, 5 Drawing Sheets

SECTION: D-D

POWER GENERATING DEVICE CONNECTED WITH EXERCISER

FIELD OF THE INVENTION

The present invention relates to a power generating device, and more particularly, to a power generating device operated by operation of an exerciser.

BACKGROUND OF THE INVENTION

Along with less space in urban life, gyms are one of the choices for most people and some people prepare exercisers at home so that they can work out at home. In order to save energy, some exercisers are equipped with power generating devices which are operated while operating the exercisers, and the power generating devices transfer the kinetic energy into electric power which is used to power the exercisers and/or stored for power other electric products. One of the power generating devices is disclosed in Taiwan Utility Patent No. 095220552, wherein the flywheel may not have precise concentricity so that when the flywheel rotates, the power generating device shakes and the vibration is transferred to the exerciser and the user, so that the user feels discomfort. Furthermore, the belt trained between the flywheel and the power shaft wears out quickly and affects the operation of the power generating device.

The present invention intends to provide a power generating device which is operated by using the exerciser and the power generating device does not need the belt and has a shock absorbing member for reducing vibration transferred to the users.

SUMMARY OF THE INVENTION

The present invention relates to a power generating device and comprises a power generating unit connected to a frame and two outer casings are connected on two sides of the power generating unit. Each outer casing has an arm and each outer casing has a resilient member. The power generating unit has an input shaft to which a roller is connected. The roller is made by silicone rubber or other anti-wearing and anti-contamination material, and contacts the energy transferring end of the exerciser by the resilient members so as to activate the power generating unit. Each of two ends of the input shaft has a magnet unit and a Si-steel coil unit connected thereto. The magnet unit is mounted to the Si-steel coil unit by the inner casing corresponding thereto. The Si-steel coil unit is fixed to the outer casing corresponding thereto. The roller is made by silicone rubber and pivotably connected to the input shaft so as to drive the flywheel and the input shaft. The frame is connected to the exerciser and a shock-absorbing member is located beneath the frame. The exerciser has a fixing board to which the frame is connected. The fixing board is an L-shaped board and includes multiple oval holes to which the frame is connected. The shock-absorbing member is made by rubber and connected to the exerciser by extending bolts through the oval holes in the fixing board. The shock-absorbing member is integrally formed with the exerciser. The frame includes two semi-circular ends and each of the two semi-circular ends has the resilient member connected thereto which is a torsion spring and fixed to the arm of the outer casing. Multiple bosses are connected to the two semi-circular ends of the frame. The power generating unit is positioned by engagement between the bosses and the arms.

The primary object of the present invention is to provide a power generating unit which does not need belts and the input shaft always drives the flywheel to generate electric power while using the exerciser. The power generating unit is compact and the generated power can power panels.

Another object of the present invention is to provide a power generating unit wherein the vibration from the power generating unit can be absorbed before being transferred to the users.

Yet another object of the present invention is to provide a power generating unit wherein the parts of the power generating unit can be conveniently replaced.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4a is an enlarged view to show the engagement between the bosses and the arms to set the angular position of the power generating unit.

DETAILED DESCRIPTION OF THE PREFERRED EMBODIMENT

Figure 1:
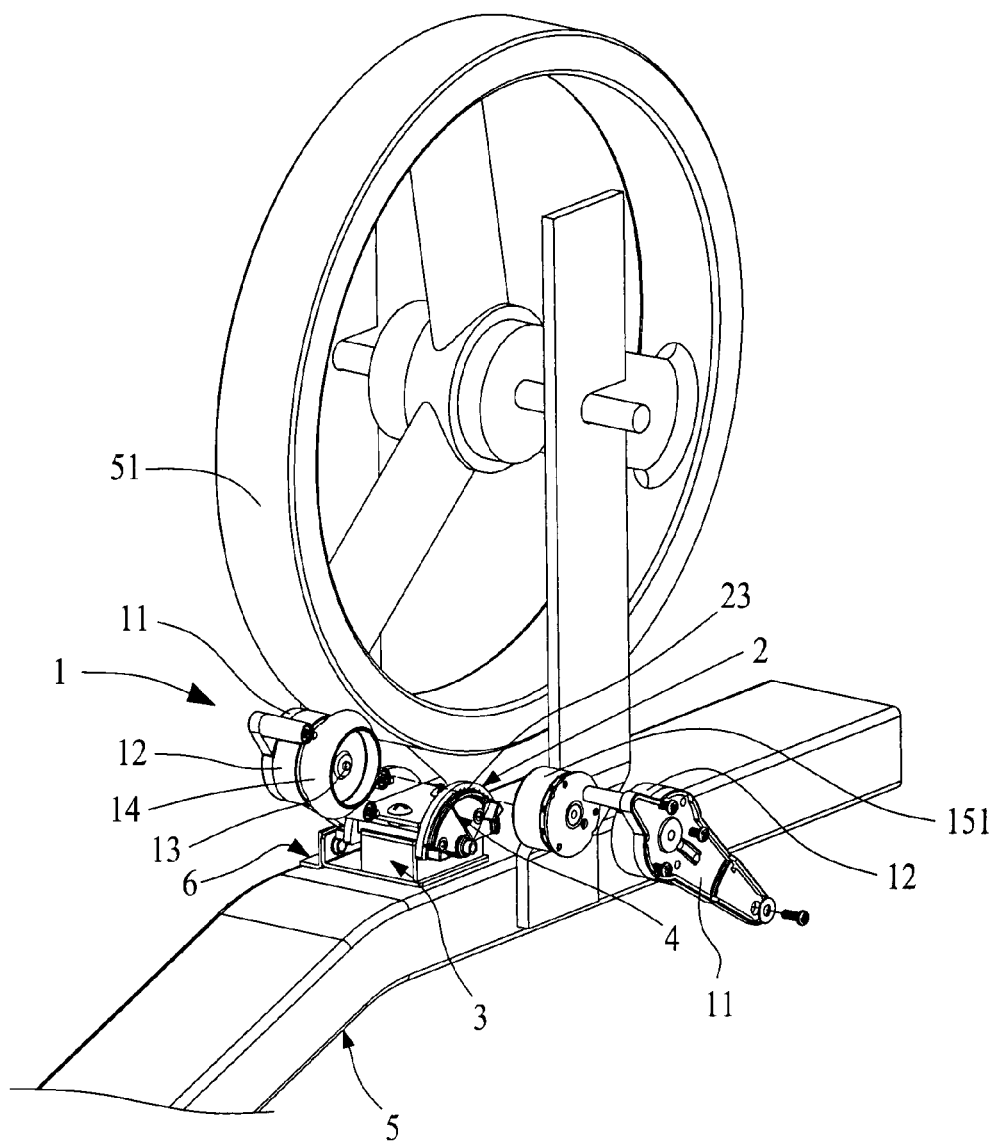
FIG. 1 is a perspective view to show the power generating unit of the present invention connected to an exerciser.
Figure 2:
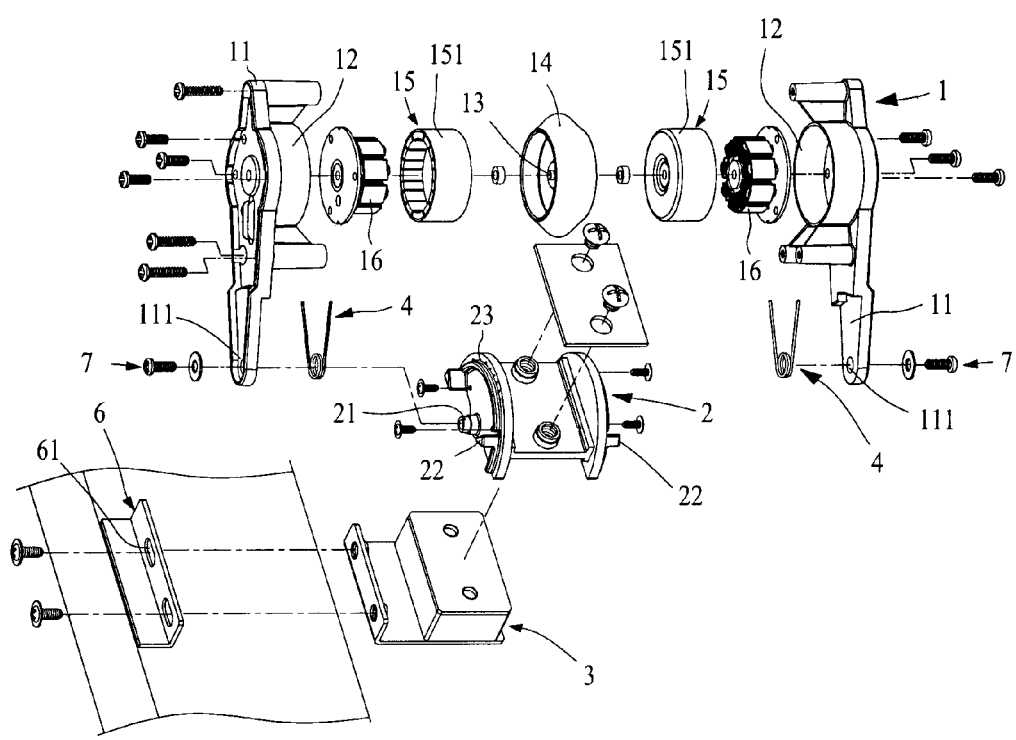
FIG. 2 is an exploded view to show the power generating unit of the present invention.
Figure 3:
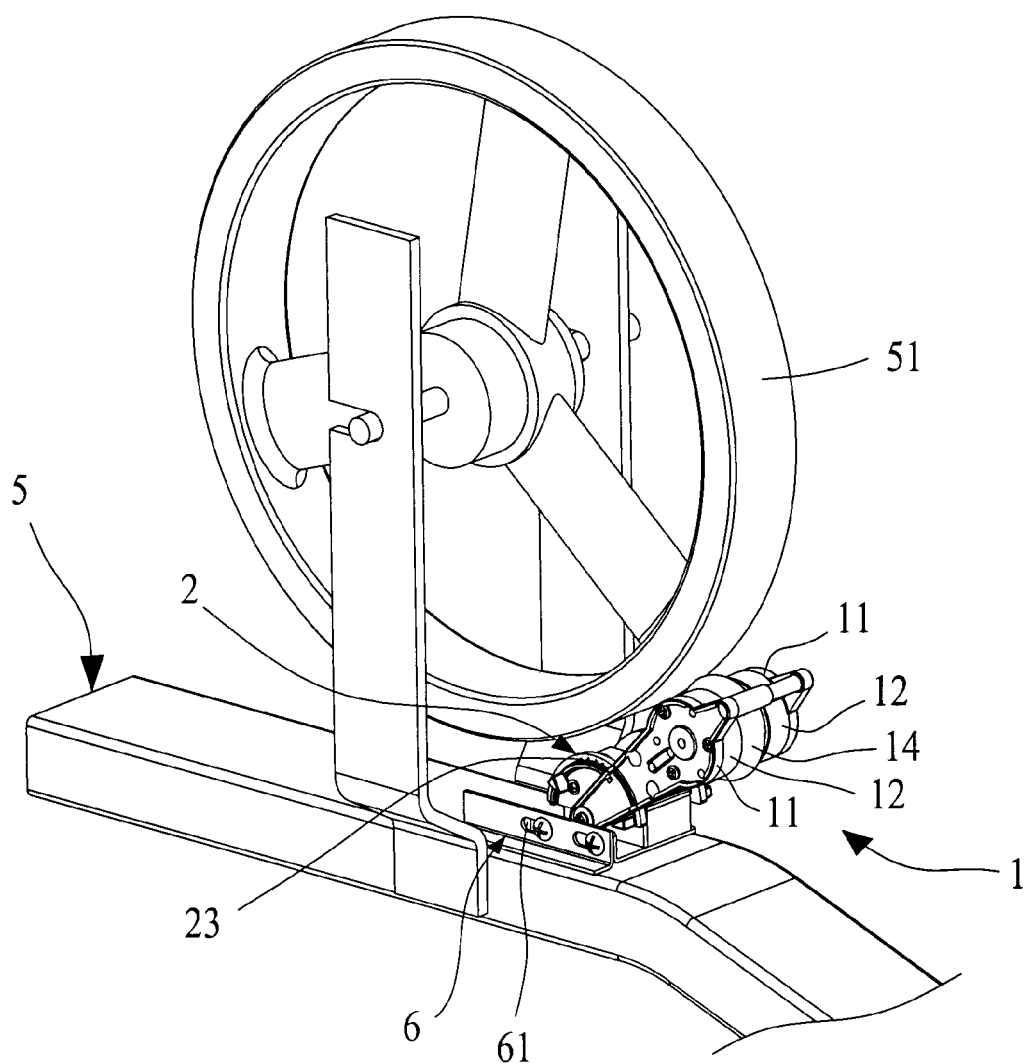
FIG. 3 is another perspective view to show the power generating unit of the present invention connected to an exerciser.

Referring to FIGS. 1, 2, 3, 4, 4a and 5, the power generating unit 1 of the present invention is connected to a frame 2 which is connected to an exerciser 5. In this embodiment, the exerciser 5 has an energy transferring end which is a flywheel 51 connected thereto and includes a fixing board 6 which is an L-shaped board and includes multiple oval holes 61 to which the frame 2 is connected.

The power generating unit 1 comprises two outer casing 12 connected on two sides thereof and each outer casing 12 has an arm 11. Each outer casing 12 has a resilient member 4 connected thereto. The power generating unit 1 has an input shaft 13 and a roller 14 is mounted to the input shaft 13. Each of two ends of the input shaft 13 has a magnet unit 15 and a Si-steel coil unit 16 connected thereto, the magnet unit 15 is mounted to the Si-steel coil unit 16 by the inner casing 151 thereof and the Si-steel coil unit 16 is fixed to the outer casing 12 corresponding thereto. Each of the Si-steel coil units 16 includes multiple wires which are electrically connected to a control circuit so as to output pre-set voltage and current to the control panel (not shown) of the exerciser 5. The input shaft 13 extends centrally through the inner casings 151 of the magnetic unit 15 and the roller 14 is mounted to the input shaft 13. The roller 14 is made by silicone rubber or other anti-wearing or anti-contamination material and pivotably connected to the input shaft 13. The roller 14 is in contact with the flywheel 51 which is the energy transferring end of the exerciser 5 by the resilient members 4. Each of the arms 11 of the outer casings 12 has a connection hole 111 and the frame 2 is connected to the outer casings 12 by extending bolts 7 through the connection holes 111.

The frame 2 is connected to the exerciser 5 and has two connection tubes 21 on two ends thereof and the bolts 7 extend through the connection holes 111 and are connected to the connection tubes 21. A shock-absorbing member 3 is located beneath the frame 2 which is connected to the fixing board 6 of the exerciser 5 by extending bolts 7 extending through the oval holes 61 of the fixing board 6. The shock-absorbing member 3 is made by rubber or other shock-absorbing material and can be integrally formed with the exerciser 5. The frame 2 includes two semi-circular ends and each of the two semi-circular ends has the resilient member 4 connected thereto which is a torsion spring and fixed to the arm 11 of the outer casing 12. The first end of each resilient member 4 is fixed to the stop 22 and the second end of each resilient member 4 is connected to the power generating unit 1. By the resilient members 4, the roller 14 is in contact with the flywheel 51 which is the energy transferring end of the exerciser 5. Multiple bosses 23 are connected to the two semi-circular ends of the frame 2 and the power generating unit 1 is positioned by engagement between the bosses 23 and the arms 11. The bosses 23 are equally distanced from each other so as to set the angular position of the power generating unit 1.

Figure 4:
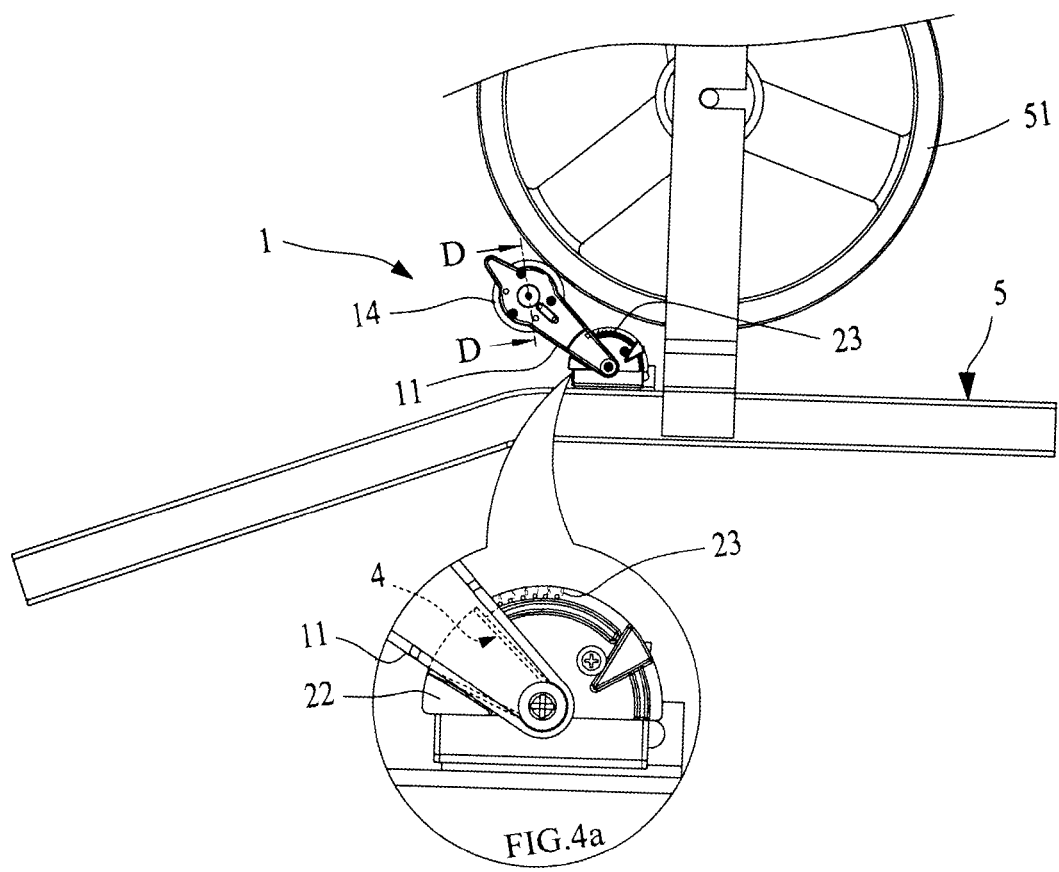
FIG. 4 is a side view of the power generating unit of the present invention connected to an exerciser.
Figure 5:
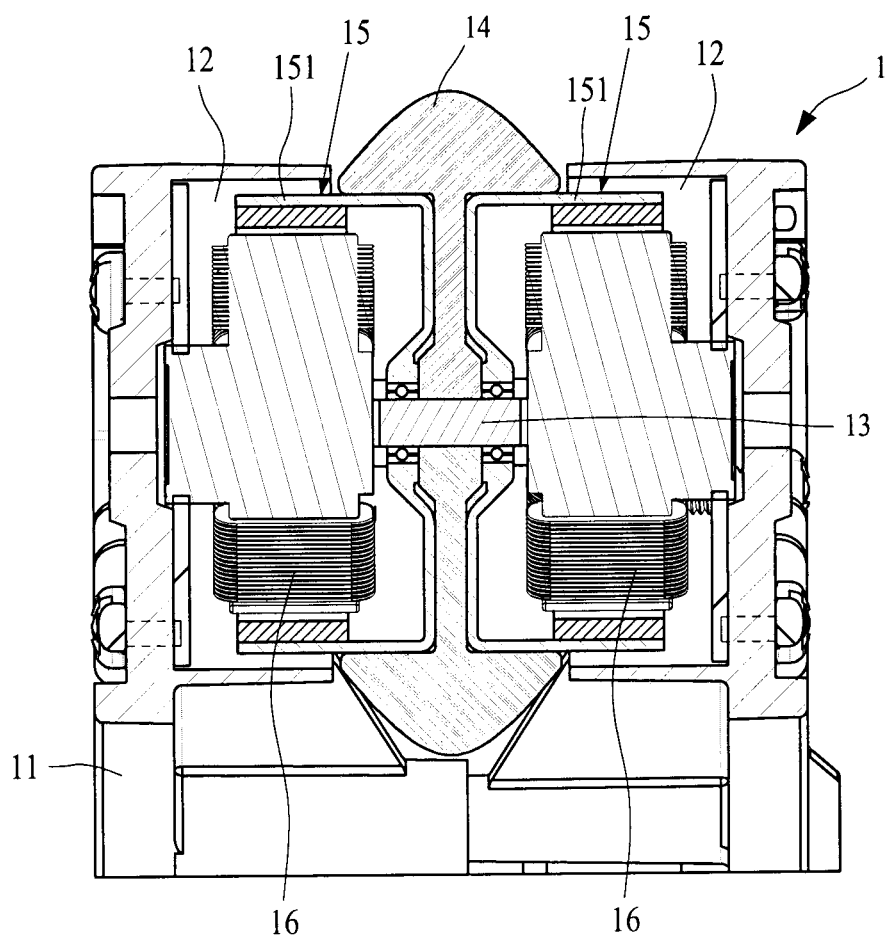
FIG. 5 is a cross sectional view to show the power generating unit of the present invention.

The shock-absorbing member 3 absorbs vibration from the power generating unit 1 when the users operate the exerciser 5. As shown in FIGS. 4 and 4a, when the roller 14 is worn out, the roller 4 can still in contact with the flywheel 51 which is the energy transferring end of the exerciser 5, by the resilient members 4 at the arms 11 of the outer casings 12. There will be no gap between the roller 14 and the flywheel 51 even if the exerciser 5 is operated for a long period of time. Therefore, the roller 14 always drives the input shaft 13 to generate electric power. When the resilient members 4 fail to function properly and cannot urge the roller 14 to contact against the flywheel 51 which is the energy transferring end of the exerciser 5, the position of the shock-absorbing member 3 can be adjusted by connected to different oval holes 61 in the fixing board 6 to ensure that the roller 14 still contacts the flywheel 51 which is the energy transferring end of the exerciser 5. Furthermore, the roller 14 is made of silicone rubber or rubber so that it can be used for a longer period of time and is not contaminated. Even if the roller 14 needs to be replaced, the user can simply unscrew the bolts 7 to replace the roller 14. Because the roller 14 is always in contact with the energy transferring end of the exerciser 5, so that the power generating device can be used on wide range of applications. The parts of the power generating device can be easily replaced and have longer life of use, and can be cooperated with different types of exercisers.

The power generating unit does not use any belt to drive the input shaft 13 which is driven by the roller 14 in contact with the energy transferring end which is the flywheel 51 as shown in FIG. 1, so that the size of the power generating unit 1 can be minimized. The resilient members ensure that the roller 14 is in contact with the energy transferring end which is the flywheel 51, even if the exerciser is operated for a long period of time. There will be no gap between the roller 14 and the energy transferring end which is the flywheel 51.

The frame 2 is connected to the shock-absorbing member 3 which is made by rubber so as to absorb vibration from the power generating unit 1. The roller 14 is made of silicone rubber or rubber so that it can be used for a longer period of time and is not contaminated. Even if the roller 14 needs to be replaced, the user can simply unscrew the bolts 7 to replace the roller 14.

While we have shown and described the embodiment in accordance with the present invention, it should be clear to those skilled in the art that further embodiments may be made without departing from the scope of the present invention.

What is claimed is:

1. A power generating device comprising:
   a power generating unit connected to a frame and two outer casings connected on two sides of the power generating unit, each outer casing having an arm, each outer casing having a resilient member, the frame having two semi-circular ends and each of the two semi-circular ends having the resilient member connected thereto which is a torsion spring and fixed to the arm of the outer casing, multiple bosses connected to the two semi-circular ends of the frame wherein the angular position of the power generating unit is adjustable through engaginthe arms with the multiple bosses, the frame being fixed to a fixing board which is an L-shaped board and includes multi le oval holes the frame connected to the fixing board by extending bolts through the oval holes and connected to the frame, the power generating unit having an input shaft, a roller mounted to the input shaft, the frame adapted to be connected to an exerciser and a shock-absorbing member located beneath the frame, the roller adapted to be in contact with an energy transferring end of the exerciser by the resilient members so as to transfer kinetic energy into electric power.

2. The device as claimed in claim 1, wherein the frame includes a connection tube and a stop connected to each of two ends thereof, the power generating unit has two connection holes and the connection tubes are securely connected to the connection holes by bolts.

3. The device as claimed in claim 2, wherein each of the resilient members is mounted to the connection tube corresponding thereto, a first end of each resilient member is fixed to the stop and a second end of each resilient member is connected to the power generating unit.

4. The device as claimed in claim 1, wherein each of two ends of the input shaft has a magnet unit and a Si-steel coil unit connected thereto, the magnet unit is mounted to the Si-steel coil unit by an inner casing thereof, the Si-steel coil unit is fixed to the outer casing corresponding thereto, the roller is pivotably connected to the input shaft so as to drive the input shaft.

* * * * *